Aug. 17, 1943.  W. BEJEUHR  2,327,089
ROTARY DEVICE FOR POSITIVE FLUID ACTION
Filed Aug. 5, 1940  3 Sheets-Sheet 1
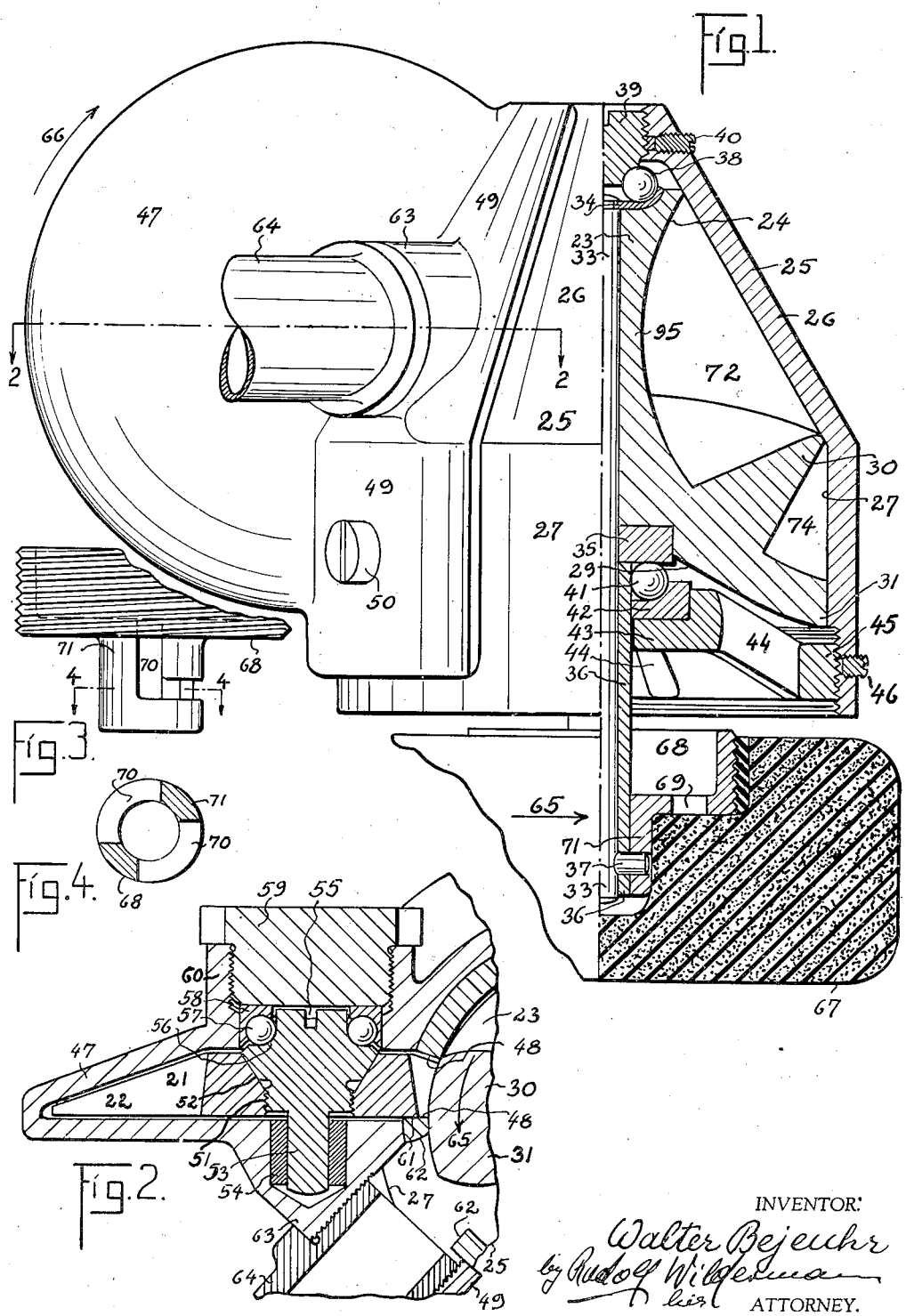
INVENTOR:
Walter Bejeuhr
by Rudolf Wildeman
 ATTORNEY.

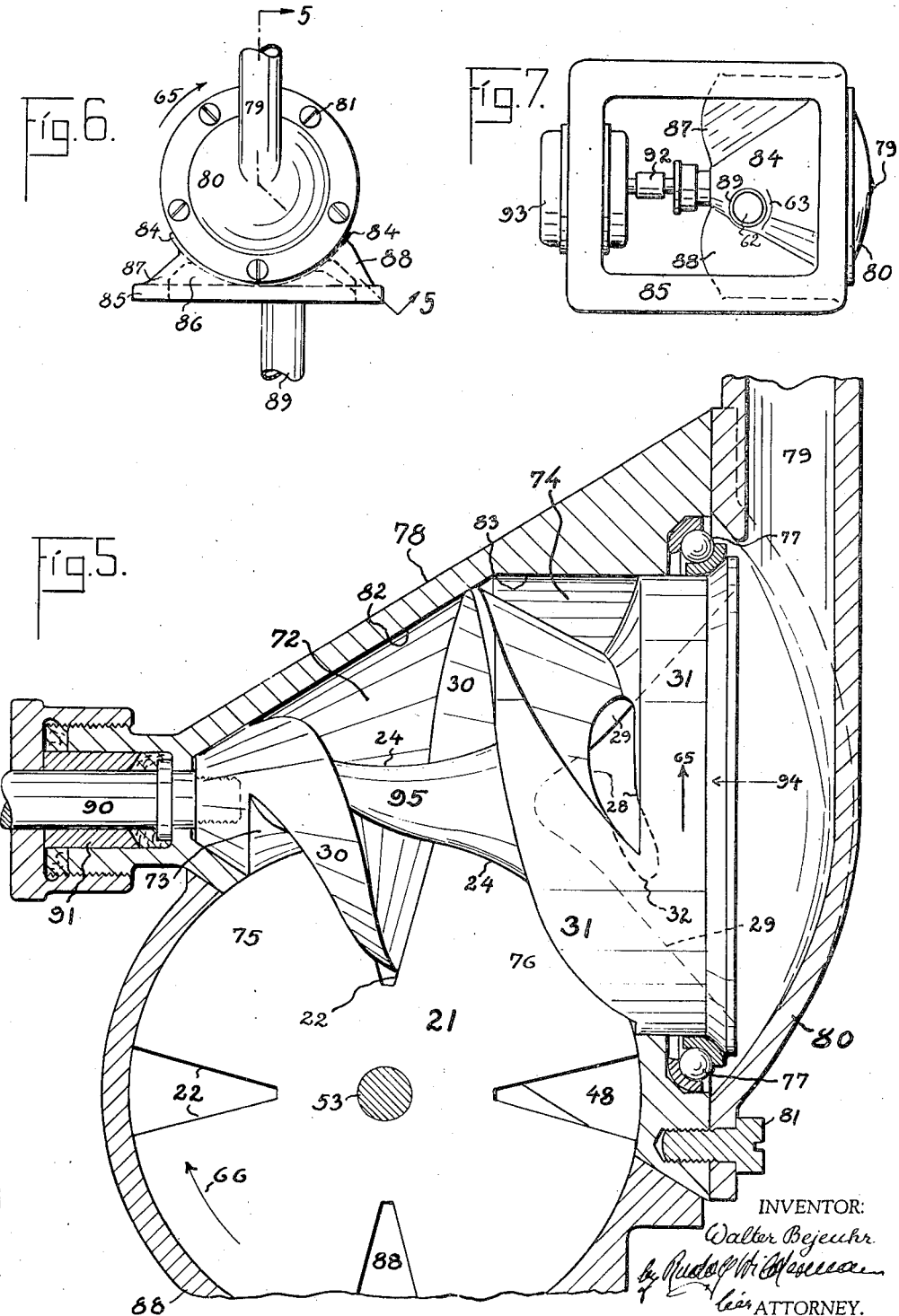

Aug. 17, 1943. W. BEJEUHR 2,327,089
ROTARY DEVICE FOR POSITIVE FLUID ACTION
Filed Aug. 5, 1940 3 Sheets-Sheet 3
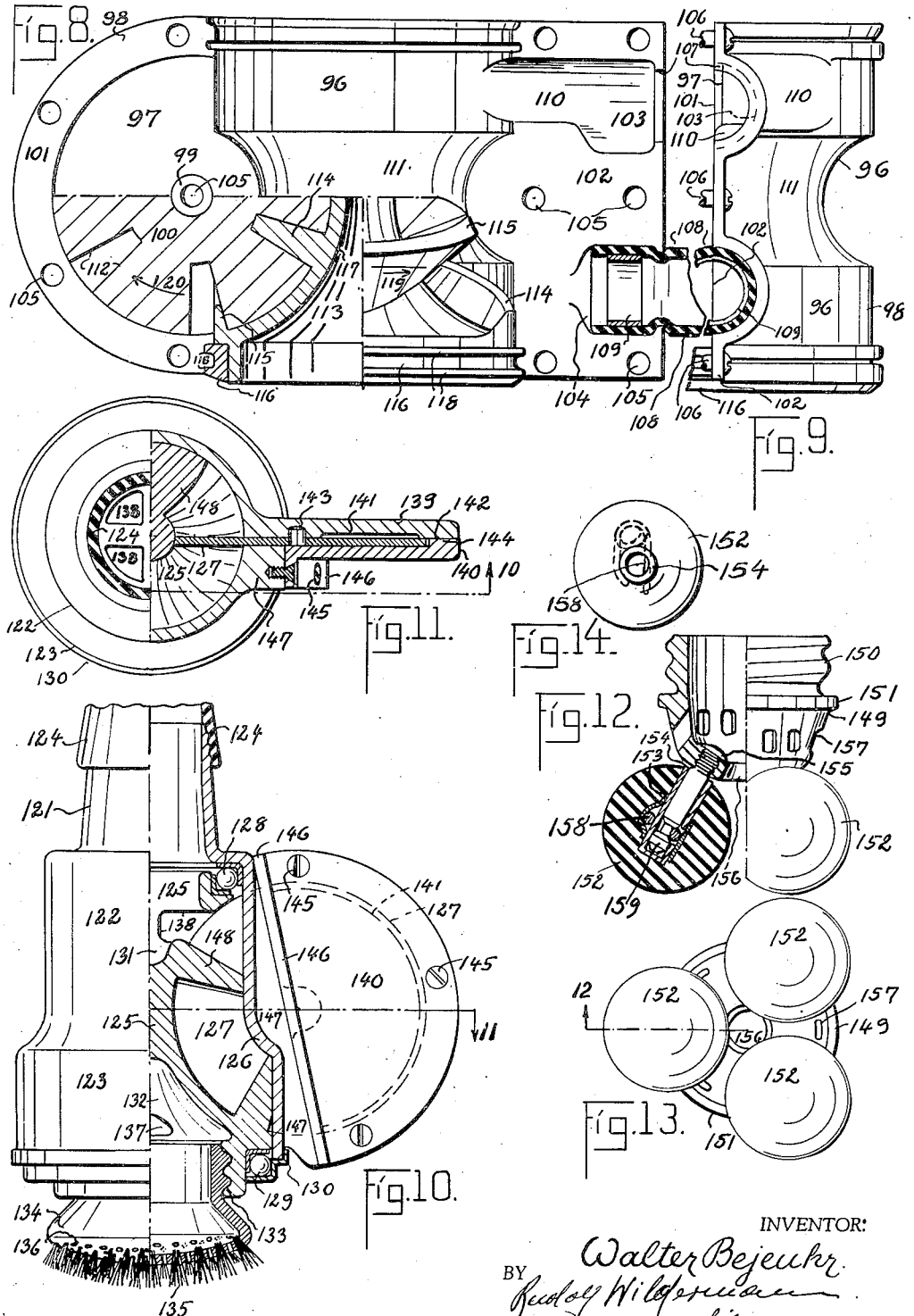
INVENTOR:
Walter Bejeuhr.
BY Rudolf Wildermann
his ATTORNEY.

Patented Aug. 17, 1943

2,327,089

UNITED STATES PATENT OFFICE 2,327,089

ROTARY DEVICE FOR POSITIVE FLUID ACTION

Walter Bejeuhr, Bronx, N. Y., assignor to American Turbotor Corporation, New York, N. Y., a corporation of New York Application August 5, 1940, Serial No. 351,469

24 Claims. (Cl. 121—71)

This invention concerns a rotary device for positive fluid action. I define such a device as a pump or motor comprising relatively revolvable or rotatable parts of valve gearing and of enclosures and conduits, which are shaped and interact in such a manner, that the parts must relatively rotate or revolve in order to permit a fluid to pass through said housing. The parts may be relatively uniformly revolved or rotated, whereupon they positively propel a fluid through the housing, and serve as a pump, compressor or booster; or on the other hand the parts shall relatively predeterminedly revolve or rotate, when a fluid is passed through the housing, whereupon the device acts as a motor; or the device is adapted both ways.

Rotary devices for positive fluid action are known. But those known devices are intricate and complicated, because they require a plurality of one or the other or of all the revolving or rotating parts, or they require auxiliary gearing in order to revolve or rotate the parts at predetermined ratios. They are elaborate and cumbersome, because the effective suction or pressure chambers represent only a small proportion of the whole device. They are inefficient for these reasons and also because there is an excessive friction of parts upon each other. They deliver a strongly pulsating flow of fluid during pump action and fluid driven devices of this character will correspondingly knock and are thus not ordinarily adapted for operation as motors.

These and other disadvantages of the devices of the prior art, as they appear also from the following description and from further comparison, are overcome by the instant invention. A ready volumetric adaptation for various speeds and more particularly for low speeds, appropriate development of the pressure and suction chambers, offering reacting surfaces for start and pull in all positions, ready adaptation of various pressure heads, and other characteristics of performance which are generally desirable in pneumatic and hydraulic devices are other objects of the instant invention.

Generally speaking the instant invention relies mechanically upon a couple, and rarely more, intermeshed rotor and valve parts compactly and snugly accommodated in a housing, and the features of construction, lubrication and packing arising in connection with gearing converted for the instant purposes are other objects of the instant invention.

While the invention will be described and shown in the following and in the accompanying drawings in various modifications, such modifications are by necessity only a selection of simple embodiments of the invention, and are therefore to be interpreted as illustrative only, and not as limitations of the invention.

In the drawings:

Fig. 1 is a partly sectioned side view of a motor driven implement.

Fig. 2 is a corresponding sectioned detail top view, which is taken at a level and in a direction indicated by dot-dash lines, arrows and the numerals 2 in Fig. 1.

Fig. 3 indicates the side view of a coupling used for assembling an implement on the motor of Fig. 1.

Fig. 4 is a corresponding cross-section at a level and in a direction pointed out in Fig. 3 by dot-dash lines, arrows and the numeral 4.

Fig. 5 is a cross-sectional side view of a pump, blower or compressor.

Fig. 6 shows a front elevation, at a reduced scale, of such a pump assembled with a motor. The appointment and direction of the section of the view of Fig. 5 is here indicated by dot-dash lines, arrows and numeral 5.

Fig. 7 is a corresponding bottom view.

Fig. 8 shows a half of a housing of another modification, with part of a sectioned valve and rotor and fully sectioned hose assembled therein.

Fig. 9 is a corresponding end view.

Fig. 10 shows a brush as an implement driven by a modified motor. The view is a partly sectioned side view, the section being taken along a dot-dash line identified in Fig. 11 by an arrow and by the numeral 10.

Fig. 11 is a corresponding partly sectioned top view, the lines of section and direction being pointed out in Fig. 10 by a dot-dash line and an arrow and the numeral 11.

Fig. 12 is a partly sectioned side view of a massage implement adapted for use with a motor of Fig. 10.

Fig. 13 is a corresponding bottom view, in which the direction and line of section of Fig. 12 is pointed out in connection with the numeral 12.

Fig. 14 is a detailed top view of a ball element of an implement of Figs. 12 and 13.

Similar numerals refer to similar parts throughout the various views:

Generally speaking the rotors herein to be described and having a column concavely flaring out in opposite directions from a slender center portion 95 and carrying a helico-spirally disposed vane 39, 113, and 114, or 148, may be more readily understood by the explanation of a mode in which they may be produced. The valves, as they are seen at 21 in Fig. 2 or Fig. 5, at 100 in Fig. 8 and at 127 in Figs. 10 and 11, are discs with notches 22 spaced regularly around their periphery. The notches are for instance shown as sectional clearances, which are blunt at their inner end pointing towards the axis of the valve. Let us imagine such a valve as a cutter or hob, which is predeterminedly spaced relatively to the axis of a rotatable rotor blank, and let the hob be rotated at a predetermined ratio of speed to the speed of rotation of the rotor blank, the speed of the rotor blank being as many times the speed of the hob as there are notches in the hob, or, if there is to be more than one vane convolution per lead of one of the vanes, then the number of notches divided by the convolutions per lead:

Valve speed (hob) =
$$\frac{\text{blank speed (rotor)} \times \text{vane convol./lead}}{\text{Number of notches}}$$

The hob or cutter is arranged to cut substantially in the plane of the axis of the rotor blank. If the hob or cutter were not notched, it would of course merely produce a concentric concave groove 24 of circular cross-section upon the rotor blank, which groove may be termed a toroidal annular groove. But notches in the hob or cutter which correspond to the notches 22 in the valve discs 21 leave material in the groove, which arises in substantially helico-spiral formation. Thus arises, for instance, the vane 30 from the bottom 24 of the toroidal annular groove of the rotor 23 of Fig. 1. The outer circumference of the rotor 23 is shaped to fit the body 25 of the housing, which is essentially a hollow cone, as shown at 26, but which merges with a cylindrical part 27 at one end, as a preferred form of body of the housing serving to avoid too wide an entrance of the body of the housing at the large end, which would result, if the body of the housing were all conical.

The rotor 23 is shown to be recessed at its large flared-out end by way of a recess or countersink 29. The crown or tip of the vane 30 is, substantially along its whole extent, in slidable abutment with the inside of the body 25 of the housing. The toroidal annular groove disappears below vane 30, where said vane merges at its crown or tip with the large end of the rotor. Just before it thus disappears, said groove extends by way of a port 28 into the countersink 29. Said port 28 does not show in Fig. 1, but it appears in Fig. 5, which, so far as the parts have been described, is in substantial agreement with the arrangement of Fig. 1. Port 28 may not only pierce the wall 24 of the toroidal annular groove below the end of the vane 30, but it may extend further underneath the surface of the rotor as indicated at 32, in order to have an adequate cross-section, or discharge or intake capacity.

For connection as a drive or to a drive a shaft extends from one, or the other, or both ends of the rotor 23. Such a shaft 33 of the motor of Figs. 1 and 2 is shown to be riveted at one end upon a ball race 34 countersunk into the small end of rotor 23. Another ball race 35 is depressed into the countersink 29 at the other end of the rotor, and fits over the shaft 33. A sleeve 36 is also slid over that end of shaft 33. It engages upon shaft 33 by way of a cross-pin 37 serving to retain the ball races, the shaft and the rotor in their assembled position.

Ball race 34 accommodates balls 38. Screw 39 indicates a complementary part of the ball bearing, serving as the other race and for axial adjustment at the small end of the rotor. By way of a set screw the screw 39 may be set in a preferred position in the housing. Screw 39 serves to close the apex of the hollow cone 26 of the housing and for adjusting the rotor in an axial direction, the conical part of the rotor 23 being thus set into running but closing proximity with the conical part 26 of the body 25 of the housing.

The other end of the rotor is supported by a ball bearing comprising the aforementioned race 34, balls 41 and the complementary race 42. Race 42 is seated in a hub 43, which hub is centered by spokes 44 in a threaded ring 45.

After screw 39 has been adjusted so that the conical part of the housing and of the rotor are in the desired contiguity, then the wheel 43, 44, 45 may be adjusted into the housing, so that end play of the rotor is substantially eliminated and then the hand wheel may be set in position, by means of the set screw 46 for instance. The sleeve 36 contributes to a radial thrust, acting in unison with races 35 and 42. The voids in the hand wheel 43, 44, 45 render the housing open at one end, so that the port 28 communicates with the outside.

The valve disc 21 is accommodated in an extension of the housing. That extension is shown in Figs. 1 and 2 as a separate cap 47, which encloses the valve disc 21 on all but one side, on which side the valve disc extends from cap 47 through a suitable slot 48 into said body 25 of the housing. By way of suitable flanges 49 the cap 47 fits onto the periphery of the body 25 of the housing, and is assembled therewith by means of screws 50, so that the disc 21 fits closingly but rotatively through the slot 48 into body 25 of the housing, where it meshes with the rotor.

By way of thread 51 and tapered shoulder 52 the stud 53 is centrally assembled with the valve disc 21. Stud 53 is provided with a slot 55 at one end, so that it can be assembled with the valve disc 21, when the valve disc 21 is in the cap 47. At one end the stud 53 is journalled in the cap by way of a bushing 54. At the other end the stud 53 has a groove 56 and serves as a race forming part of the ball bearing 57, which has the outer race 58. A plug 59 positions the outer race 58 of ball bearing 57 in a hub 60 extending from the cap 47, so that the ball race also supports the valve disc 21 in end thrust, and retains the valve disc 21 in sliding and closing abutment upon the marginal edge 61 of the body 25 of the housing confronting the slot 48 on one side. The side, with which the valve disc 21 slidably abuts upon the edge 61 is also the side, which serves to take up the reaction of a fluid passing through the housing and propelling the rotor 23, so that the ball bearing 57 serves to take up such reaction.

Near the slot 48, through which the valve disc 21 extends into the body 25 of the housing, and facing the reaction side of said valve disc 21, is arranged the intake port or the fluid actuating the device. Thus there is another opening 62 in the body 25 of the housing, which opening 62 registers with a tapped hole in a lug 63 of the cap 47 and which arises from the flange 49 thereof. From the tapped hole in lug 63 connects a hose coupling or pipe 64, through which a suitable propelling fluid is supplied to the device.

When the motor of Figs. 1 and 2 is driven by water entering through pipe 64, the rotor will be propelled in counterclockwise direction as indicated by arrow 65 (Fig. 2), and the valve 21 will rotate in clockwise direction (Fig. 1) as indicated by arrow 66, the operation being explained in detail hereinafter. The water, the energy of which has been spent, will leave by way of the port 28 of rotor 23, and will splash between the spokes 44 onto an implement which is mounted on the shaft underneath, for instance a sponge 67. The sponge 67 is assembled upon a rigid core 68 by way of which it is mounted upon the motor of Figs. 1 and 2. The core 68 may be suitably perforated, as indicated at 69, for the purpose of allowing the water to pass through such core into sponge 67.

The sponge 67 or any other implement may be removably mounted upon the motor, for instance by way of bayonet lock, groove 70 being indicated for such purpose in the hub 71 of the core 68, such groove engaging upon the opposite ends of the pin 37 extending from shaft 33 through sleeve 36.

Water entering through pipe 64, which also may serve as a handle for the device, upon the housing, fills one or more chambers formed between the valve 21 and the rotor 23 upon the said inside of the housing. The manner, in which the rotor is then actuated, may be best understood from Fig. 1 the front of the housing together with the intake port and pipe 63, 64, whereupon we see, upon the inside, the valve 21 and rotor 23 in the very position, in which the similar valve 21 and rotor 31 shown in Fig. 5. The operation of the device may from this point on be more readily followed in the view of Fig. 5.

The water entering through pipe 64 finds the vane 30 substantially squarely in its path, so that the stream of water is divided, part of it going up into a portion 73 of the spirally disposed groove formed by the vane 30 in the toroidal annular groove 24, that portion 73 of the groove being however limited by the wing 75 formed between a pair of notches 22 of the valve 21, so that the upper part of the stream of water is blocked in said portion 73 of the groove. The rest of the stream of the water passes from pipe 64 underneath the vane 30 into another portion 72 of the spirally disposed groove, said groove 72 being limited at the top by the wing 75, and at the bottom by the wing 76 of the valve 21. Thus the stream of water entering by way of pipe 64 is blocked in the upper portion 73 and in the lower portion 72 of the helically disposed groove extending in the rotor inside of the housing.

There is a third portion 74 of the helically disposed groove, which extends from the wing 76 to the bottom end of said groove, said third portion 74 being however open to the outside by way of the port 28 of the rotor. Neither the valve 21 nor the toroidal part 24 of the grooves in the rotor can yield to the pressure exerted by the water in portions 72 and 73. But the pressure, under which the water impinges upon the top of vane 30 in the portion 73 of the groove has two components, one of which is disposed in the direction of the axis of the rotor, whereas the other one is of peripheral direction and applies a torque to the rotor, to which the rotor yields, because it is freely rotatably journalled in the housing. A similar torque due to the pressure of the water on the bottom of the same section of vane 30 acts in an opposite direction in portion 72 of the groove. But this torque is several times exceeded by another force exerted in portion 72 of the helically disposed groove by the water pressing down upon the section of the vane disposed between portions 72 and 74. The rotative component of this latter force is disposed in the same direction as the only rotative torque we found acting in portion 73, and the rotor yields to these combined forces, counteracting the counter forces mentioned inbetween. The rotating rotor will of course also cause the valve 21 to rotate around stud 57, the wings 75 and 76 closing the portions 73 and 72, while said portions enlarge and take in water from the inlet pipe 64. Eventually the flow of water entering upon the housing is however shut off by vane 30 from the portion 72, the water flowing thereafter only into the portion 73. At substantially this moment the wing 76 of valve 21 has slid in the helically disposed groove onto the port 28, so that the water occluded in portion 72 may now flow out of port 28, e. g. into the open, and onto the sponge 67.

During further rotation of the rotor the portion 72 of the helically disposed groove eventually assumes the position of portion 74 first mentioned. The portion 73 has by that time assumed the position of the portion 72, and a new portion 73 is swung up; the water being divided by the vane 30 into two streams flowing into new portions 73 and 72, so that the hydraulic play starts over again from the starting point from which on it was described, and the rotor continues its rotation.

The large end of rotor 23 is rotatively supported at its center in the housing, by way of ball bearing 41 resting in the central hub 43. But this central support, as well as spokes 44 and ring 45 may be avoided, so that there is a clear path for the water leaving the rotor by way of port 28, if the large end of the rotor is journalled around its outer circumference. This is illustrated in Fig. 5, where the rotor 31 is supported by the ball bearing 77 in the body portion 78 of the housing. This ball bearing is developed for end as well as for radial thrust, because it has to take up the reaction of the water head built up by the rotor acting as a pump in the vertical pipe 79 extending up from the elbow flange 80 closing the large end of the body 78 of the housing. Flange 80 is shown to be assembled with the body portion 78 by way of screws 81, said body portion 78 extending in this instance upon its outside in a straight conical formation, whereas upon the inside thereof the conical portion 82 at the smaller end and the cylindrical portion 83 at the larger end are preserved in conformity with the outline of the rotor 31.

The outwardly conical body portion 78 of the housing rests in a correspondingly conically recessed sector 84. Said sector 84 is made one with an open rectangular base 85 by way of a front wall 86 and inclined legs 87 and 88 at opposite sides. But leg 88 is hollow, and corresponds in respect to its interior arrangements to the extension 47, which accommodates in Figs. 1 and 2 the valve 21. In other words the leg 88 accommodates the valve 21, e. g. by way of a stud 53 in the manner shown in Fig. 2. The valve 21 again fits into the body 82 of the housing by way of a slot 48; and there is again a tapped hub 83 admitting water to the housing body 78 and connecting by way of a riser to a fluid supply, from which a fluid is to be pumped up by way of the pump of Figs. 5, 6 and 7 into a pipe 79.

From the small end of rotor 31 extends a shaft 90 through the body 78 of the housing by way of a stuffing box 91. Shaft 90 may be driven from a suitable source of mechanical power; e. g. it may be connected by coupling 92 to an electric motor 93 mounted upon the rectangular base 85.

When the rotor is motor-driven as shown, the rotor is the driver and the valve is the follower, as it is always the case in connection with the fluid driven device of Figs. 1 and 2. However, it is readily understood by those versed in the art of helical gearing, that under particular circumstances, for instance when there is more than one vane involving a corresponding larger lead of the vane (Fig. 8), then the driving mechanism may be applied to the valve 21, and the valve 21 becomes the driver and rotor 31 the follower of the pump.

For purposes of comparison the direction of rotation of the rotor, 65, and valve, 66, has been assumed to be the same for the motor of Figs. 1 and 2 as for the pump of Figs. 5, 6 and 7. Under these conditions the water also flows the same direction through the devices; i. e. in a motor of Fig. 1 a fluid is forced in through port 62 and leaves, i. e. drains by way of the port 28. Whereas in the case of the pump of Figs. 5, 6 and 7 the fluid is sucked in through port 62 (hub 63), and leaves by way of port 28 under pressure. Because the portions 73 and 72 of the helically disposed groove of the rotor enlarge in the pump, when the rotor is driven in the direction indicated by arrows 65, i. e. in clockwise direction in Fig. 6. Thus a fluid is sucked into the portions 73 and 72 from the intake pipe 89, until the vane 30 has moved past the opening or port 62. Then no more fluid is taken into portion 72, but the contents of said portion are pushed out by the wing 75 of valve 21 through port 28. Portion 72 eventually passes through the stage at which portion 74 is shown, the contents of portion 74 being pushed at the stage shown in Fig. 5 out through port 28 by the wing 76.

Thus the rotor 31 of Fig. 5 reacts in the direction of arrow 94, such reaction being taken up by the ball bearing 77. The valve 21 reacts up from the plane in which it is in Fig. 5, which reaction presses it onto the edge 61 of opening 48, producing a better closing of the suction compartments 72 and 73. These reactions of the rotor and of the valve are respectively opposite to the reactions of these parts in the motor of Figs. 1 and 2. But these reactions of the pump of Fig. 5 are reversed, if the pump is rotated in an opposite direction, and sucks in a fluid by way of pipe 79 and discharges it by way of pipe 89. On the other hand the respective reactions in connection with a motor like that of Figs. 1 and 2 would also be reversed, if the pressure fluid were passed through the housing in an opposite direction; i. e. if the device of Fig. 5 is used as a motor, and a pressure fluid enters by way of pipe 79 and leaves by way of pipe 89, then the axial reaction of the rotor and of the valve are the same as when the device of Fig. 5 serves as a pump and the rotor is driven in the direction of arrow 65.

A motor of Figs. 1 and 2 is particularly useful, where the hazards of an electrical motor are to be avoided, or where there is no supply of electricity. On the other hand motors of this kind compare very favorably with electrical motors in respect to efficiency as well as in respect to output/weight. The capacity and pressure performance per weight of a pump like that shown in Fig. 5 is also extraordinary.

When the device is executed in corrosion proof material, the driving or driven fluid may be water, and the water may readily be used for lubrication. Lubrication may be provided for in connection with devices used with gas by executing one or the other part, for instance the housing, in a self-lubricating material or metal. While experiments have shown, that devices of this kind can be operated at very high speeds, they are particularly useful in comparison with other motors in respect to low speed, because these motors can be operated at a "crawling" speed; and that is ordinarily impossible with electrical motors.

It should be noticed, that the bottoms of notches 22 do not have to extend into closing formation with the tip or crown of vane 30. However the sealing of the various parts upon each other may be improved upon if we curve the body of the housing concentrically to the axis of the valve, in which case the bottom of the notches 22 may be in alignment with the inner surface of the body of the housing, so that they also fit closely onto the crown or tip of the vane 30. Such arrangements will, for instance, be found in the modified devices of Figs. 8 to 11.

Aside from other questions, in particular manufacturing and production problems, the layout of parts must also be guided by considerations of the structural strength of the parts. Thus the shape of notches 22 in valve 21 and the center distance between the valve and the rotor must be taken into consideration for proper sliding of the parts upon each other, and more particularly concerning the strength of the vane and the thickness of the slenderest portion 95 of the column of the rotor. The shape of the housing affects, of course, the desired development of the portions 72, 73 and 74 of the spirally disposed groove, and such development is guided by considerations of the nature of the fluid to be used, e. g. whether it is compressible like a gas, or is a non-compressible liquid, like water.

Cap 97 and body 98 of two-partite housing 88 of Figs. 8 and 9 are executed in one, and only one of the halves of the housing is shown, because the other half is exactly the same. For purposes of a seal the two halves should be gasketed, where they are in abutment, e. g. upon the struck-up hub 99, around which idles the valve 100, upon the rim 101 outwardly closing the cap portion 97, and upon the flange 102 on the opposite side of the device, which has the depressions 103 and 104 forming, in pairs, the intake and outlet port. These abutting portions of the halves of the housing are perforated, so that the halves can be tightly assembled by way of screws 106 and nuts extended through such perforations.

When the two halves are assembled the depression 103 in one of the halves forms a port together with the depression 104 in the other half, such port having a circular entrance, which is provided with a contracted rim 107. That rim will engage, for instance, upon hose 108 inserted therein and the elastic hose may be reinforced by a ring 109 inserted thereinto so that it is pressed into sealing abutment with the circular inner portion of the port. Whereas the depression 104 ends with such a circular portion, the depression 103 is further depressed therebehind at 110, so that the fluid is tangentially introduced into (or withdrawn from) the body portion 96. Near its middle the body portion 96 is receded by way of a toroidal annular groove 111, which has a pitch diameter passing through the center of the hub of the valve 100. Notches 112 extend, for instance radially, towards the center of the valve 100 to a diameter which corresponds to that of the convex portion of the toroidal annular groove 111. There are six notches 112 in valve 100, and every second one of these notches 112—proceeding in a peripheral direction—meshes in rotation with one of the vanes of rotor 113, there being two such vanes, 114 and 115. Vanes 114 and 115 are entwined in double thread fashion.

Only a substantially symmetrical half is shown of the valve 100—which portion is additionally cross-sectioned—and of the rotor 113, which is partly cross-sectioned. In the end view of Fig. 9 the rotor and the valve are not shown. This view shows, however, portions of one hose and of the lower ring 116.

The rotor 113 rotatably fits the bottom portion 96 of the housing, and may be suitably journalled and sealed in said portion by gasket rings 116 at opposite ends. These rings are shown to have rims 118 which fit corresponding recesses in the body portion of the housing. Aside from these recesses, and from the toroidal annular groove 111 the body portion 96 is shown to be cylindrical.

The rotor 113 has no ports, and a double flare 117 extends clear through rotor 113. This flare may serve, at either end of the rotor 113, to engage upon or to receive an object to be rotated or to be revolved.

One of the ports formed by the recesses 103, 104 serves as an intake for the fluid entering upon the device, the fluid leaving the device by the other port.

Let the upper depressions 103 and 104 serve as a port, which is connected to a fluid supply. Through the broadened portion 110 of the depression 103 of said port, the fluid will rush into the one or two helically disposed grooves between vanes confronting the depression 110 and will fill such groove portions up to the valve 100 on the opposite side of the device. Then the fluid pressure will start rotating the rotor in the direction indicated by arrow 119, i. e. in a counter-clockwise direction seen from the top. In a manner corresponding to that described in connection with Fig. 1, this rotation continues, the valve 100 rotating in the clockwise direction indicated by arrow 120. The fluid will descend through the rotating rotor and will leave the device by the lower port, into which in Fig. 8 the hose 108 is inserted.

Whereas in the modification just described in connection with Figs. 8 and 9, the fluid enters as well as leaves the device on one side, a fluid enters upon and leaves the modification of Figs. 10 and 11 in the direction of the axis of the rotor. The housing of this modification is shown exemplarily to have three consecutive steps 121, 122 and 123. The smallest step 121 serves as a nipple, upon which is engaged the hose 124 introducing the driving fluid, e. g. the water. The rotor 124 occupies the two other steps 122 and 123, each one of which steps is substantially cylindrical; however, there is a toroidally flared interconnecting portion 126 between the steps 122 and 123, the pitch circle of this toroidal section extending through the axis of valve disc 127. A ball bearing 128 is accommodated in the recess between steps 121 and 122, and another ball bearing 129 is retained upon the free end of the body portion of the housing by a cap 130. Between these two ball bearings 128 and 129 the rotor 125 is journalled and has flared recesses 131 and 132 at opposite ends, the latter recess 132 being provided at its entrance with means, e. g. an Edison thread 133, which removably receives a suitable implement, e. g. a hollow brush end spray 134, in which perforations 136 are interspersed between bundles of bristle 135.

From the recess or countersink 132 extends the port 137 into the spirally disposed groove of rotor 125, so that the fluid issues from the motor by way of said recess or countersink 132 out to the open or into an attached implement, like brush 132. In this respect, as well as in respect to other details of arrangement not specifically explained, the rotor 125, and also the valve 127 meshing therewith, are substantially analogous to the corresponding parts of the devices of Fig. 1 or 5. However, there is another intake port 138 upon the rotor, at its other end, through which the fluid enters from the first step 121, of the housing, instead of entering from the sides, as it did in Figs. 1 and 5, by way of the port 62. If this port 138 is made comparatively large, so that a fluid entering by way of step 121 of the housing strikes substantially unobstructedly upon the upper extent of the top convolution of the vane 148 of the rotor 125, we may make good use of the kinetic energy of fluid entering by way of step 121 of the housing, in addition to a positive conversion of the potential energy thereof, which latter proceeds in the manner explained in connection with the other devices hereinbefore described. The cap accommodating valve 127 is here again made one with the body of the housing, the cap being represented by a lobe 139 extending radially from the two steps 122 and 123, of the housing, and being covered by a closing lid 140. Except where there are clearances such as 141 in the lobe 139, such clearances reducing the friction of the valve 127 on said lobe, lobe 139 extends flat at its front 142, as a supporting surface for the valve 137; and said flat surface 142 extends right into the body of the housing, by way of a slit snugly but rotatably accommodating the valve disc 127. A pin 143 removably arises from the flat surface 142 and serves as a shaft for valve 127. Pin 143 is retained in position by the lid 140, which is recessed in order to clear the flat valve disc 127. But the lid abuts and closes upon the flat surface 142 by way of a rim 144 through which it is assembled with the lobe 139 by screw 145.

A flange 146 is screwed onto and closes upon an inclined ledge 147 bridging the two steps 122 and 123 of the housing and it extends angularly from the lid 140.

A variety of implements may replace the brush 134, many of which, such as other rubbing implements, may use to advantage the driving fluid, e. g. water, if such fluid is allowed to spout out from the lower end of the device. Figs. 12 and 13 suggest a massage implement. The hollow cap 149 has a flange 151 and a thread 150 suited for attachment to a rotor, e. g. the Edison thread 133 at the discharge end of rotor 125.

Arbors 155 are affixed in a circle to the cap 149, at an angle but in a plane with the axis of the cap. The drawings show these arbors arranged in a triangle and each affixed by a thread upon the end and by then being riveted over upon the concave side of the cap 149. Near their other free ends the arbors 155 are grooved, so that a head 159 is produced, which has slanted, e. g. conical faces at the front and in the back.

These arbors 155 rotatably accommodate the bushings 154. Each bushing 154 has a slot upon one side, and one leg of a clip 158 normally seats at the bottom of said slot, said clip being bent to engage tensionally over the bushing 154. Said leg of the clip 158 in the slot partially closes the bore of bushing 154, as it is illustrated in Fig. 4. In order to prevent the rubber mass from entering upon the bushing, when the rubber ball 152 is vulcanized around the bushing 154, a protective tape 153 may be wrapped over the clip 158 when first engaged upon the bushing 154, as shown.

When a ball 152 which has just been vulcanized over a bushing 154 is thrust onto an arbor 155, the leg of clip 158 extending through the slot in bushing 154 will snap into the grooves below heads 159 of arbor 155, so that the rubber ball 152 is then endwise engaged and rotatable upon the arbor 155.

When cap 149 is mounted upon the rotor of the device of this invention, and the rotor is actuated, the water splashes from the rotating cap 149 through central and lateral openings 156 and 157 onto the revolving ball elements 152 which are also rotated when applied to a surface, e. g. the skin. Different features of improvement are taught by different embodiments of the drawings. These features are not exclusive to the respective embodiments, but they may be interchanged and logically features shown in any figure may be introduced or substituted in another embodiment by anybody versed in these arts. Thus an implement like that of Figs. 12, 13 and 14, may be applied to a device like that shown in Fig. 1, after the bearing at the large end of the rotor of the device of Fig. 1 has been replaced by a threaded portion, and the rotor has been journalled differently, e. g. in an outer ball race of the type shown in connection with the device of Fig. 5. The body 25 of the housing and the cap 47 may also be executed in one continuity and may then be arranged as a two-partite housing like that of Figs. 8 and 9, the combined housing being split at a plane normal to the axis of the valve disc 21, and parallel to the axis of the rotor 31. Features of the invention have been combined in the manner just described in a device, which is at this time being successfully marketed by the assignee herein.

Having thus described my invention in detail, yet I do not wish to be limited thereby, except as the appended claims may require; for it is obvious that various modifications and changes may be made in the form of embodiment of my invention, without departing from the spirit and scope thereof:

What I claim is:

1. In a device of the character described, a rotor having a central column with a concave surface representing the inner section of a hollow tore and having a vane extending in at least one convolution around said rotor, arising from said concave surface and helically disposed relatively to the pitch circle of said tore, said rotor being flared out at one end only substantially in concentricity with said toroidal surface, a round valve fitting said concave surface at its periphery and notched to mesh with said vane, a housing rotatably accommodating and closing over said rotor and valve but predeterminedly clearing said surface so that chambers are formed in the concavity between the housing, the rotor, and the valve, and an intake and an outlet port connecting with such chambers at opposite ends of said rotor.

2. A portable fluid driven motor of hand held size and of the character described, consisting of a housing having a circular body, a rotor enlarging from one end to the other and shaped to fit said housing but grooved in order to provide a channel underlying said body of the housing, a slotted valve disc extending through a slit in said body of the housing into mesh with said rotor as a partition subdividing said channel, a flexible fluid connection opening onto said channel at the small end of said motor, and a circular cap extending out from said housing and rotatably accommodating the part of said disc extending to the outside of said body.

3. In a device of the character described, a housing having a circular body, a rotor shaped to fit said housing but grooved in order to provide a channel underlying said body of the housing, a slotted valve disc extending substantially in the plane of the axis of said rotor through a slit in said body of the housing into mesh with said rotor as a partition subdividing said channel, a cap extending out from said housing and rotatably accommodating the part of said disc extending to the outside of said body, and a fluid intake port angularly disposed between said housing and cap and opening onto said rotor at said valve, said port directing a fluid taken in therethrough to impinge substantially in the direction of rotation of the rotor onto the major portion of that surface of the channel which is subject to move in reaction to such fluid.

4. In a device of the character described, a housing having a circular body of largest inside diameter at one end, a rotor journalled in said housing and toroidally flared but having a vane arising therefrom in order to provide a channel underlying said body of the housing, a slotted valve disc extending through a slit in said body of the housing into mesh with said rotor as a partition subdividing said channel, and a cap extending out from said housing and rotatably accommodating and shaped to close around the part of said disc extending to the outside of said body.

5. A portable device of the character described, consisting of a housing having a circular body of larger inside diameter at one end than at the other and an inclined slit between said ends, a rotor shaped to fit said housing but grooved in order to provide a channel underlying said body of the housing, an intake and an outlet opening directly from the outside onto and from said rotor, respectively, and a slotted valve disc extending through a slit in said body of the housing into mesh with said rotor as a partition subdividing said channel, and a circular cap extending from said housing between said ends and closing over said slit and said valve.

6. In a device of the character described, a housing having a circular body of larger inside diameter at the end than at an intermediate point, a conical rotor shaped to fit said housing but grooved down to a toroidal surface in order to provide a channel underlying said body of the housing, and a slotted valve disc extending through a slit in said body of the housing into mesh with said rotor as a partition subdividing said channel.

7. In a device of the character described, a rotor having substantially circular ends and being helically grooved intermediate to said ends, a circular housing rotatably accommodating but sealing over said rotor from one end thereof to the other, a revoluble valve disc fitting through a slit in said housing into mesh with the helical groove on said rotor, and a pair of ports in said housing connecting by way of the inside and the outside of the rotor, respectively, from portions of the groove on said rotor which portions are normally separated from each other by said disc.

8. In a device of the character described, a rotor having substantially circular ends and being helically grooved intermediate to said ends, a circular housing sealing over said rotor from one end thereof to the other, a revoluble valve disc fitting through a slit in said housing into mesh with the helical groove on said rotor, and ports connecting to the outside from portions of the groove on said rotor which are normally separated from each other by said disc, one of said ports extending at a slant relatively to said disc and in a direction spaced relatively to the axis of said rotor and the other port extending into the rotor from the groove thereon and emerging from said rotor by way of one of the circular ends thereof.

9. In a device of the character described, a housing having a conically recessed body, a rotor journalled in said housing and having a conical surface fitting said body, and a notched valve disc revolubly mounted in said housing and meshingly extending therefrom into a helically disposed groove in said surface of the rotor.

10. In a device of the character described, a housing having a conically recessed body, a rotor journalled in said housing and having a surface fitting said body, and a notched valve disc revolubly mounted in said housing and meshingly extending therefrom into a helically disposed groove in said surface of the rotor, the said housing being two-partite, substantial halves thereof closing over the meshing rotor and valve.

11. A portable rotary device for positive fluid action made in hand held size and comprising a grooved rotor and a disc valve shaped to engage upon each other in gear fashion, a split housing rotatably supporting said rotor and valve in mesh with each other and contiguously closing over said rotor and valve but clearing the grooves of said rotor and valve, said housing consisting of integral halves connected in a plane parallel to said disc valve the grooves of the rotor on one side of the axis of said rotor being completely closed and filled by the valve in the plane of said valve, and relatively spaced fluid intake and outlet ports directly connecting to the outside substantially from the ends of the groove of said rotor between which ends the valve meshes with said groove.

12. A rotary device for positive fluid action comprising a grooved rotor and a valve shaped to engage upon each other in gear fashion, a housing rotatably supporting said rotor and valve in mesh with each other and contiguously closing over said rotor and valve but clearing the grooves of said rotor and valve, the grooves of the rotor on one side of the axis of said rotor being completely closed and filled by the valve in the plane of said valve, relatively spaced fluid intake and outlet ports connecting to the outside substantially from the ends of the groove of said rotor between which ends the valve meshes with said groove, one of said ports issuing centrally from one end of said rotor, and antifriction means journalling said rotor in said housing at its said end.

13. A portable rotary device for positive fluid action comprising a grooved rotor and a valve shaped to engage upon each other in gear fashion, a housing rotatably supporting said rotor and valve in mesh with each other and contiguously closing over said rotor and valve but clearing the grooves of said rotor and valve, the grooves of the rotor on one side of the axis of said rotor being completely closed and filled by the valve in the plane of said valve, relatively spaced fluid intake and outlet ports connecting to the outside substantially from the ends of the groove of said rotor between which points the valve meshes with said groove, one of said ports issuing centrally from one end of said rotor, and attachment means at said end of the rotor for removably securing thereon an implement to be driven thereby.

14. A rotary device for positive fluid action comprising a grooved rotor and a valve shaped to engage upon each other in gear fashion, a housing rotatably supporting said rotor and valve in mesh with each other and contiguously closing over said rotor and valve but clearing the grooves of said rotor and valve, the grooves of the rotor on one side of the axis of said rotor being completely closed and filled by the valve in the plane of said valve, the rotor having a central recess at one end, said recess communicating with said rotor grooves, and a single shaft extending from the other end of said rotor and journalled only at that end in said housing.

15. A rotary device for positive fluid action comprising a grooved rotor and a valve shaped to engage upon each other in gear fashion, a housing rotatably supporting said rotor and valve in mesh with each other and contiguously closing over said rotor and valve but clearing the grooves of said rotor and valve, the grooves of the rotor on one side of the axis of said rotor being completely closed and filled by the valve in the plane of said valve, a shaft on said rotor extending from said device, relatively spaced fluid intake and outlet ports connecting to the outside from points of a gear groove of said rotor between which points the valve meshes with said gear groove, one of said ports issuing from a central recess of said rotor, and a pipe flange closing the housing over said end of the rotor, the housing closing at its other end around said shaft.

16. In a rotary device for fluid action, a rotor, a tapered portion on said rotor, a valve, the tapered portion of said rotor being grooved in order to mesh in worm gear fashion with said valve, a housing closing over said rotor and said valve but clearing the respective grooves and slidably accommodating said tapered rotor portion, and adjustable retaining means engaged upon opposite ends of said rotor and serving for axially adjusting said rotor in said housing.

17. In a rotary device for actuation by a liquid, a rotor axially enlarging in diameter towards one end and having a helicospiral channel for the driving liquid and an inwardly directed outlet for said channel at said one end, and connecting means in said end of said rotor for attaching an implement to be driven by said rotor and for centrally superimposing such implement upon said rotor at said end, so that such an implement, when attached to the rotor, is inundated by the liquid issuing from said rotor through said outlet.

18. In a rotary device for fluid action, a rotor and a valve intermeshed for control of a fluid, said rotor enlarging in outside diameter, where intermeshed with said valve, toward one end and being cylindrical at said end, and a housing extending over said rotor and valve, said rotor being thrustwise seated in said housing from its said end.

19. In a rotary device for fluid action, a rotor and a valve intermeshed for control of a fluid, said rotor enlarging in outside diameter, where intermeshed with said valve, toward one end and being cylindrical at said end, a housing extending over said rotor and valve, and retaining means for said rotor arranged in said housing where it extends over said one end of the rotor.

20. In a rotary device for fluid action, a rotor and a valve intermeshed for control of a fluid, said rotor enlarging in outside diameter where intermeshed with said valve, toward one end and being cylindrical at said end, a housing extending over said rotor and valve, and adjustable retaining means for said rotor arranged in said housing where it extends over said one end of the rotor.

21. A rotary device for positive fluid action comprising a grooved rotor and a valve to engage upon each other in gear fashion, a housing rotatably supporting said rotor and valve in mesh with each other and contiguously closing over said rotor and valve but clearing the grooves of said rotor and valve, the grooves of the rotor on one side of the axis of said rotor being completely closed and filled by the valve in the plane of said valve, and intake and outlet ports opening coaxially with said rotor from said device.

22. A rotary device for positive fluid action comprising a grooved rotor and a valve to engage upon each other in gear fashion, a housing rotatably supporting said rotor and valve in mesh with each other and contiguously closing over said rotor and valve but clearing the grooves of said rotor and valve, the groves of the rotor on one side of the axis of said rotor being completely closed and filled by the valve in the plane of said valve, said rotor being hollow and having outwardly open intercommunicating central recesses at opposite ends.

23. A rotary device like that of claim 22, in which the housing is of hand held size and consists of substantially like halves exclusively shaped for operatively assembling and closing over the rotor and valve.

24. A portable rotary device for positive fluid action comprising a grooved rotor and a valve shaped to engage upon each other in gear fashion, a housing rotatably supporting said rotor and valve in mesh with each other and contiguously closing over said rotor and valve but clearing the grooves of said rotor and valve, and a rigid conduit opening directly upon the rotor surface and into the rotor grooves, extending to the outside of the device and serving for a means through which a pressure fluid is supplied as well as for a handle for manipulating the device as a whole.

WALTER BEJEUHR.